United States Patent
Yang

(10) Patent No.: US 8,826,557 B2
(45) Date of Patent: Sep. 9, 2014

(54) CALIPER

(76) Inventor: Jen-Yung Yang, Taichung (TW)

(*) Notice: Subject to any disclaimer, the term of this patent is extended or adjusted under 35 U.S.C. 154(b) by 230 days.

(21) Appl. No.: 13/552,859

(22) Filed: Jul. 19, 2012

(65) Prior Publication Data

US 2014/0007445 A1 Jan. 9, 2014

(51) Int. Cl.
*G01B 5/14* (2006.01)
*G01B 5/00* (2006.01)
*G01B 3/16* (2006.01)
*G01D 21/00* (2006.01)
*G01B 3/18* (2006.01)

(52) U.S. Cl.
USPC ............... 33/811; 33/806; 33/807; 33/808; 33/810; 33/609; 33/783; 33/812; 33/815; 33/817; 33/830; 33/831; 33/610

(58) Field of Classification Search
CPC ............ G01B 3/20; G01B 3/205; G01B 3/02; G01B 5/02; G01B 3/166; G01B 3/18; G01B 5/06; A61B 5/0053; A61B 5/1075; A61B 5/1076

USPC ........... 33/811, 806, 807, 808, 810, 812, 815, 33/817, 831, 830, 783, 609, 610
See application file for complete search history.

(56) References Cited

U.S. PATENT DOCUMENTS 2,920,395 A * 1/1960 Germann .................. 33/534
4,608,759 A * 9/1986 Bowhay .................... 33/796

* cited by examiner

*Primary Examiner* — Peter Macchiarolo
*Assistant Examiner* — Rhyan C Lange

(57) ABSTRACT

A caliper for measuring the size of an object, especially the thickness of an object with non-planar surfaces. After measured, the caliper can be removed from the object without changing the measured value. The caliper includes a scale ruler, a vernier slidably disposed on the scale ruler, a first jaw fixedly connected to the scale ruler and a second jaw pivotally connected to the vernier. In normal state, the second jaw is kept in a position in alignment with and in parallel to the first jaw, whereby the caliper can be used to measure the object in a common manner. After measured, the second jaw is rotated to another position, permitting the caliper to be removed from the measured object.

8 Claims, 5 Drawing Sheets

CALIPER

BACKGROUND OF THE INVENTION

1. Field of the Invention

The present invention relates generally to a vehicle service tool, and more particularly to caliper, which is applicable to, but not limited to, a brake disc for measuring the thickness thereof.

2. Description of the Related Art

It is known that a disc brake system includes a brake master cylinder and a brake wheel cylinder. When a driver pedals the brake pedal, via the fluid in the brake master cylinder, the pressure is transmitted to the piston of the brake wheel cylinder on the brake caliper for driving the brake linings to tightly clamp the brake disc. In this case, the rotational speed of the wheel is lowered down under the frictional force against the brake disc so as to achieve the object of braking.

However, the braking effect is achieved by means of the friction between the brake linings and the brake disc. Therefore, the wear of the contact faces of the brake linings and the brake disc is inevitable. With respect to the brake linings, the wear is relatively obvious and thus it is necessary to periodically replace the brake linings. With respect to the brake disc, the wear is concentrated on a part of the brake disc that contact with brake linings. Referring to FIG. 3, the brake disc 50 is only partially worn to form two annular grooves 51 on two faces of the brake disc 50 respectively. It is known that the travel of the brake wheel cylinder is fixed. Therefore, in the case that the brake disc 50 is over-worn and the thickness between the bottom walls of the annular grooves 51 is too thin, the braking performance will be directly affected to threaten the safety in driving.

According to the conventional technique, the thickness of the brake disc is generally measured by means of a caliper ruler or a micrometer caliper. With respect to the caliper ruler, the measurement jaws can simply attach to a complete plane face so that the caliper ruler can be only used to measure a brand-new brake disc, which has not been used yet. As to a used and worn brake disc with the annular grooves on two faces, the caliper ruler can be hardly used to measure the thickness of the brake disc. With respect to the micrometer caliper, it can be used to measure the thickness of both a brand-new brake disc and a worn brake disc with the annular grooves. However, the measurement value shown by the micrometer caliper only indicates the distance between the shaft and the anvil. As a result, once the distance between the shaft and anvil changes, the shown value will synchronously change. Accordingly, it is necessary for a user to read the brake disc thickness value of the micrometer caliper still connected to the wheel hub in a narrow space and then take off the micrometer from the brake disc. Therefore, it is quite inconvenient to use the micrometer caliper.

SUMMARY OF THE INVENTION

It is therefore a primary object of the present invention to provide a caliper for measuring the size of an object, especially the thickness of an object with non-planar surfaces. After measured, the caliper can be removed from the object without changing the measured value.

To achieve the above and other objects, the caliper of the present invention includes: a main body having a scale ruler with a predetermined length, a vernier slidably disposed on the scale ruler and reciprocally displaceable along a length of the scale ruler and a restriction section for locking the vernier on the scale ruler without displacement, one side of the scale ruler being marked with a main scale along the length of the scale ruler, one side of the vernier being marked with a subsidiary scale; and a measurement section including a first jaw fixedly connected to one end of the scale ruler and a second jaw disposed on the vernier in alignment with and in parallel to the first jaw. The distance between the first jaw and the second jaw is variable with the displacement of the vernier along the scale ruler. A first measurement end protrudes from one side of an end of the first jaw, which side is proximal to the second jaw. A second measurement end protrudes from one side of an end of the second jaw, which side is proximal to the first jaw. The caliper is characterized in that the second jaw is pivotally connected to the vernier via a pivot pin and is swingable around the pivot pin between a first position and a second position to change an angle contained between the first and second jaws. The caliper further includes a locating section disposed on the vernier. The locating section has a restriction body movable between a third position and a fourth position. When the restriction body is positioned in the third position, an abutment end of the restriction body is engaged with one side of the second jaw to restrict the second jaw to the first position. When the restriction body is positioned in the fourth position, the abutment end is disengaged from the second jaw, permitting the second jaw to freely swing between the first and second positions.

The present invention can be best understood through the following description and accompanying drawings, wherein:

DETAILED DESCRIPTION OF THE PREFERRED EMBODIMENTS

Figure 1:
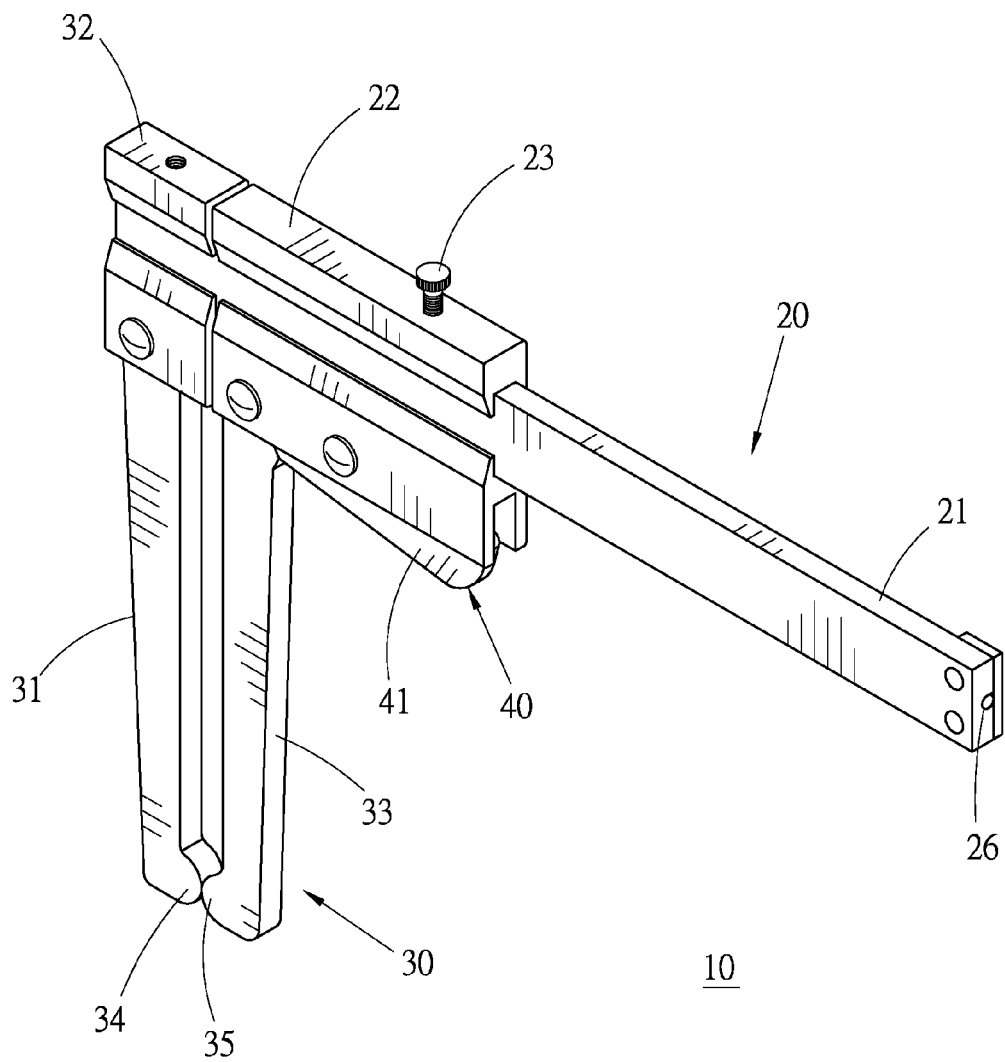
FIG. 1 is a perspective assembled view of a preferred embodiment of the present invention.
Figure 2:
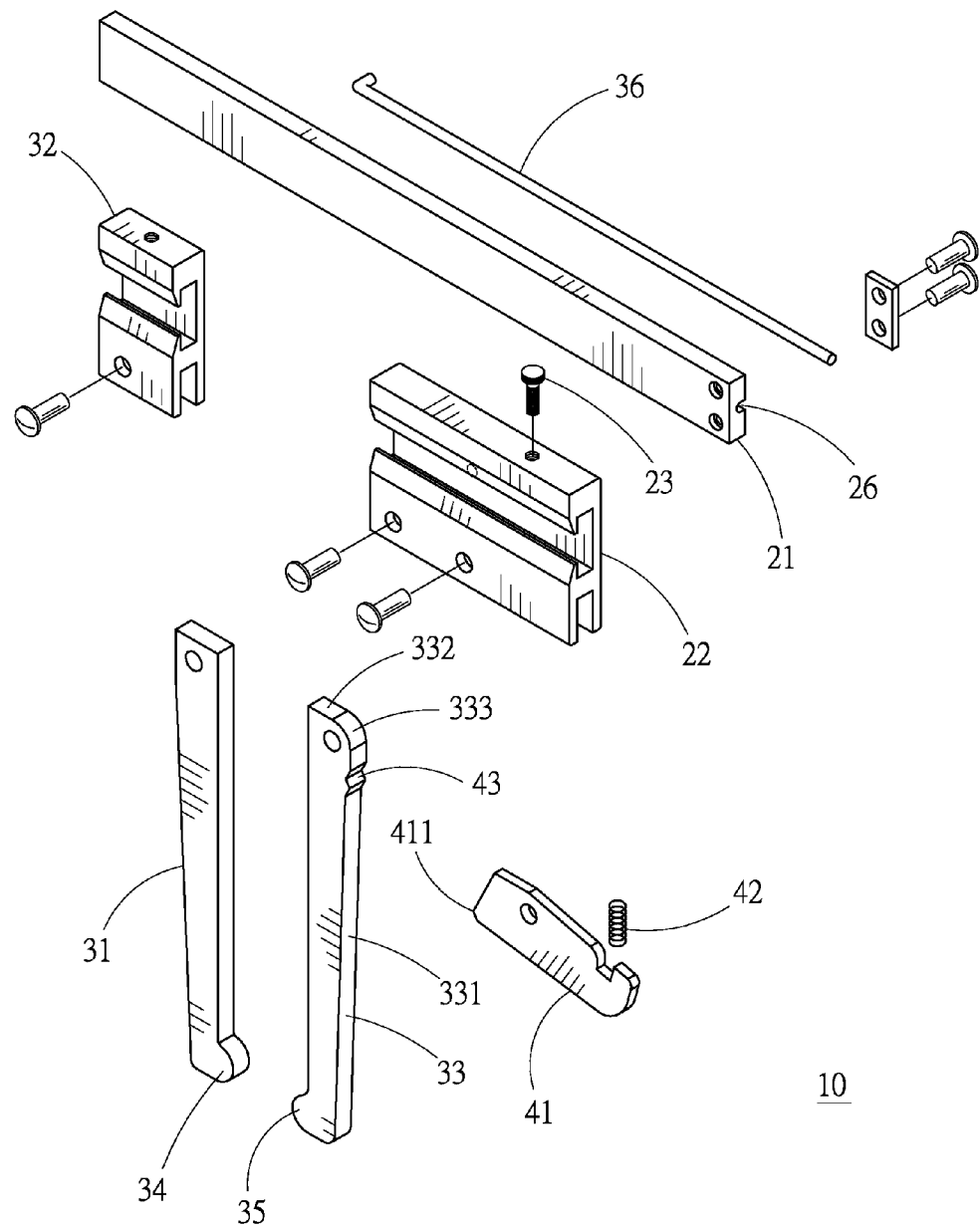
FIG. 2 is a perspective exploded view of the preferred embodiment of the present invention.

Please refer to FIGS. 1 to 5. According to a preferred embodiment, the caliper 10 of the present invention includes a main body 20, a measurement section 30 and a locating section 40.

The main body 20 has a scale ruler 21 with a certain length in the form of a rectangular slat and a vernier 22 substantially in the form of a block. The vernier 22 is slidably disposed on the scale ruler 21 and reciprocally linearly displaceable along a length of the scale ruler 21. A restriction section 23 formed of a bolt is screwed on the vernier 22. One end of the restriction section 23 can abut against the scale ruler 21 to lock the vernier 22 on the scale ruler 21 without displacement. One side of the scale ruler 21 is marked with a main scale 24, while one side of the vernier 22 is marked with a subsidiary scale 25 for showing the size data of a measured article. The other side of the scale ruler 21 is recessed to form a slide channel 26 extending along the length of the scale ruler 21.

The measurement section 30 includes a first jaw 31 in the form of an elongated bar and a second jaw 33 also in the form of an elongated bar. One end of the first jaw 31 is indirectly fixedly connected to one end of the scale ruler 21 via a fixing seat 32. The length of the first jaw 31 is normal to the length of the scale ruler 21. One end of the second jaw 33 is pivotally connected to the vernier 22 in alignment with and in parallel to the first jaw 31. A distance between the first jaw 31 and the second jaw 33 is variable with the sliding movement of the vernier 22. In addition, the second jaw 33 is swingable around a pivot pin between a first position and a second position to change an angle contained between the first and second jaws 31, 33. To speak more specifically, when the second jaw 33 is positioned in the first position, the second jaw 33 is in parallel to the first jaw 31. When the second jaw 33 is positioned in the second position, the lengths of the first and second jaws 31, 33 contain an acute angle. An arched first measurement end 34 protrudes from one side of the other end of the first jaw 31, which side is proximal to the second jaw 33. An arched second measurement end 35 protrudes from one side of the other end of the second jaw 33, which side is proximal to the first jaw 31. The first and second measurement ends 34, 35 are opposite to each other. A measurement rod 36 with a certain length is slidably inlaid in the slide channel 26. One end of the measurement rod 36 is fixedly connected to the vernier 22, whereby the measurement rod 36 is displaceable relative to the scale ruler 21 in parallel to the length of the scale ruler 21 along with the movement of the vernier 22 so as to extend the other end of the measurement rod 36 from the other end of the scale ruler 21.

To speak more specifically, the second jaw 33 has an elongated jaw body 331. One end of the jaw body 331 is pivotally connected to the vernier 22. A part of an end face of the end of the jaw body 331 is a locating plane face 332. When the second jaw 33 is positioned in the first position, the locating plane face 332 is attached to an adjacent plane face of the vernier 22. Another part of the end face of the end of the jaw body 331 is a rotary arched face 333 in adjacency to the locating plane face 332. The pivot pin pivotally connected between the jaw body 331 and the vernier 22 is positioned at a curvature center of the rotary arched face 333. Accordingly, when the second jaw 33 is rotated between the first and second positions, the rotary arched face 333 can abut against the vernier 22 in a rolling manner to keep the rotation stable.

The locating section 40 is disposed on the vernier 22 for elastically normally restricting the second jaw 33 to the first position. The locating section 40 has a restriction body 41 in the form of an elongated plate. The restriction body 41 is pivotally disposed on the vernier 22 and is rotatable around a pivot pin between a third position and a fourth position. An elastic member 42 formed of a spring is sandwiched between the one end of the restriction body 41 and the vernier 22 for providing an elastic force to keep the restriction body 41 in the third position. An engagement notch 43 with a certain depth is formed on one side of the second jaw 33. The other end of the restriction body 41 is an abutment end 411, which can be correspondingly engaged in the engagement notch 43. Accordingly, when the restriction body 41 is positioned in the third position, the abutment end 411 is engaged in the engagement notch 43 and the elastic member 42 provides an elastic force to keep the restriction body 41 in the third position, whereby the second jaw 33 is restricted to the first position. When an external force is applied to the restriction body 41 to offset the elastic force provided by the elastic member 42 and pivotally rotate the restriction body 41 from the third position to the fourth position, the second jaw 33 is released from the restriction and permitted to freely swing between the first and second positions.

Figure 3:
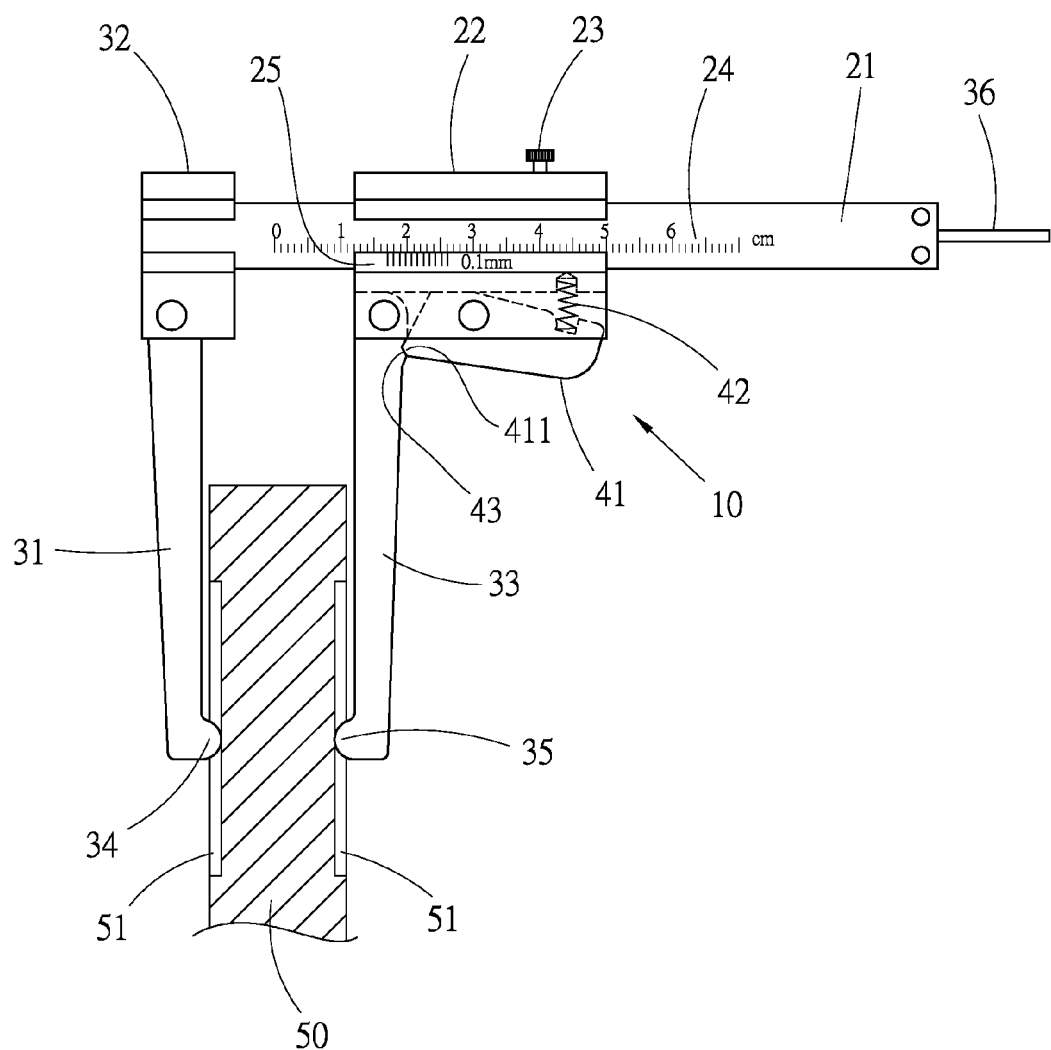
FIG. 3 is a plane view of the preferred embodiment of the present invention, showing that the caliper of the present invention is used to measure the thickness of a brake disc.
Figure 4:
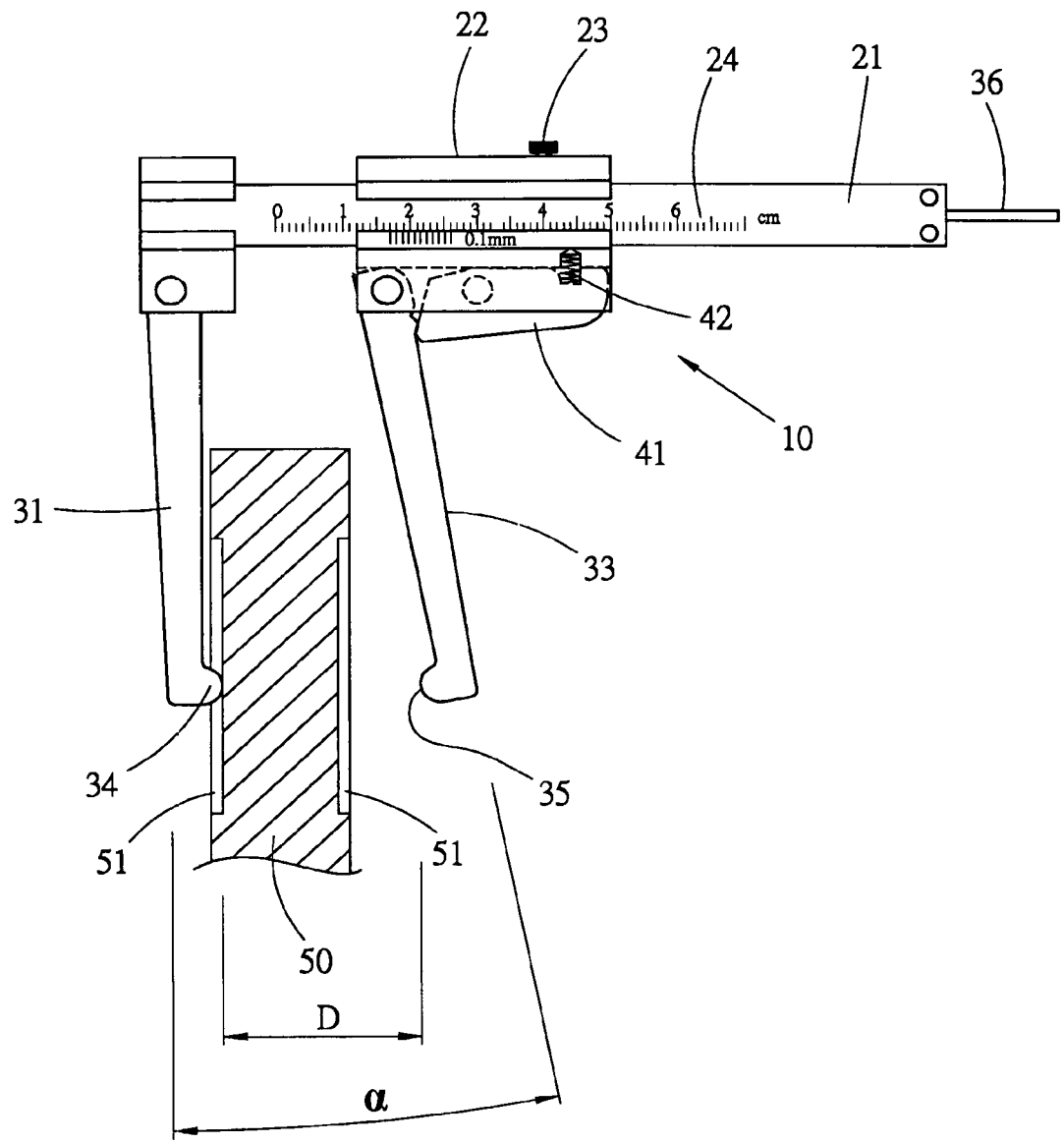
FIG. 4 is a plane view of the preferred embodiment of the present invention, showing that the caliper of the present invention is to be removed from the brake disc after measured.
Figure 5:
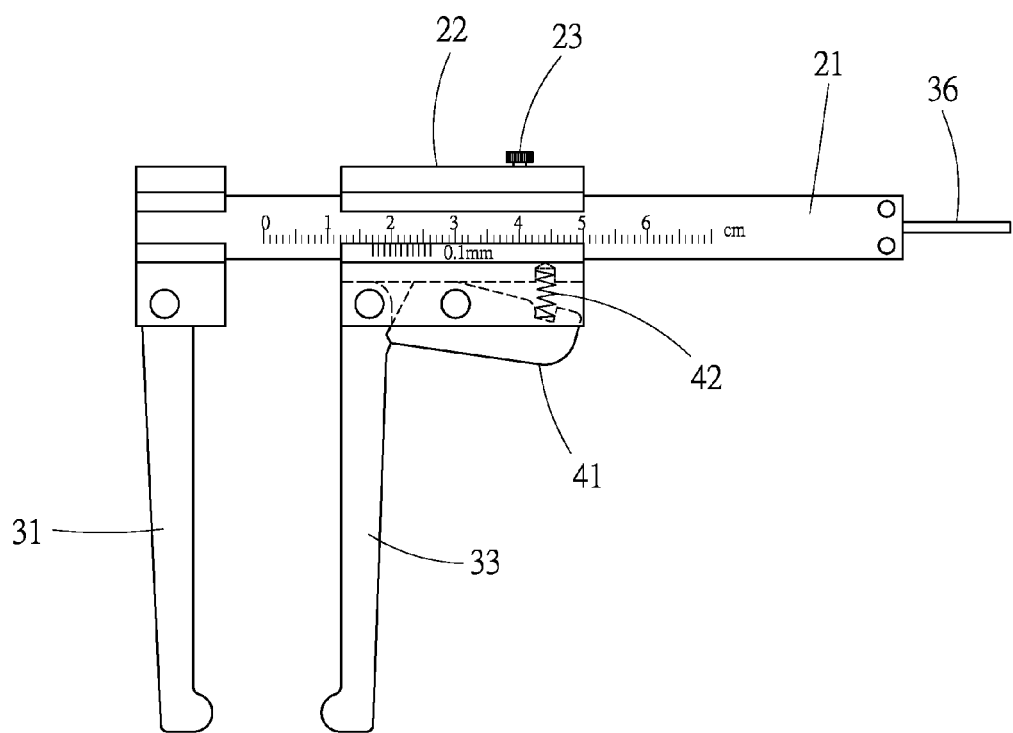
FIG. 5 is a plane view of the preferred embodiment of the present invention, showing that the caliper of the present invention is removed from the brake disc.

According to the above arrangement, the caliper 10 can be used to measure the thickness of a used brake disk 50 worn with annular grooves. Referring to FIGS. 3 to 5, in a common measurement method of a conventional caliper, a user can hold a brake disc 50 between the first and second jaws 31, 33 with the opposite first and second measurement ends 34, 35 extending into the annular grooves 51 of the worn brake disc 50 in abutment with the bottom walls thereof. In this case, the data shown by the main scale 24 and the subsidiary scale 25 can indicate the value of the thickness of the worn brake disc.

At this time, in order to facilitate the user's reading the data shown by the main scale 24 and the subsidiary scale 25, the vernier 22 is first locked on the scale ruler 21 with the restriction section 23 so as to keep that the measured value unchanged. Then, the user can conveniently manually apply a force to the restriction body 41 for pressing and rotating the restriction body 41 from the third position to the fourth position. Under such circumstance, the second jaw 33 can be freely swung. At this time, the user can apply a force to the second jaw 33 to rotate the second jaw 33 from the first position to the second position to enlarge the angle α contained between the first and second jaws 31, 33 and thus enlarge the distance D between the first and second measurement ends 34, 35. In this case, the caliper 10 can be easily removed from the measured brake disc 50. Accordingly, the user can conveniently read the value shown by the main scale 24 and the subsidiary scale 25.

The caliper 10 enables a user to measure the thickness of the brake disc and read the measured value at different times. That is, the user can first measure the thickness of the object in a narrow space and then read the measure value in a wider place. In comparison with the conventional technique, the use of the caliper is much more facilitated.

In addition, in the field of vehicle service, the measurement rod 36 serves as a measurement tool for measuring such as the depth of tire stripes. Accordingly, the caliper 10 can be more widely applied in the field of vehicle service.

Furthermore, it should be noted that in the above embodiment, the restriction body 41 of the locating section 40 is pivotally connected to the vernier 22. In practice, the manner in which the restriction body 41 is connected to the vernier 22 is not limited to the above embodiment. For example, alternatively, the restriction body 41 can be slidably connected to the vernier 22 and movable between the third and fourth positions. This arrangement can achieve the same effect as the first embodiment.

The above embodiments are only used to illustrate the present invention, not intended to limit the scope thereof. Many modifications of the above embodiments can be made without departing from the spirit of the present invention.

What is claimed is:

1. A caliper comprising: a main body having a scale ruler with a predetermined length, a vernier slidably disposed on the scale ruler and reciprocally displaceable along a length of the scale ruler and a restriction section for locking the vernier on the scale ruler without displacement, one side of the scale ruler being marked with a main scale along the length of the scale ruler, one side of the vernier being marked with a subsidiary scale; and a measurement section including a first jaw fixedly connected to one end of the scale ruler and a second jaw disposed on the vernier in alignment with and in parallel to the first jaw, a distance between the first jaw and the second jaw being variable with the displacement of the vernier along the scale ruler, a first measurement end protruding from one side of an end of the first jaw, which side is proximal to the second jaw, a second measurement end protruding from one side of an end of the second jaw, which side is proximal to the first jaw, said caliper being characterized in that the second jaw is pivotally connected to the vernier via a pivot pin and is swingable around the pivot pin between a first position and a second position to change an angle contained between the first and second jaws, the caliper further comprising a locating section disposed on the vernier, the locating section having a restriction body movable between a third position and a fourth position, when the restriction body is positioned in the third position, an abutment end of the restriction body being engaged with one side of the second jaw to restrict the second jaw to the first position, when the restriction body is positioned in the fourth position, the abutment end being disengaged from the second jaw, permitting the second jaw to freely swing between the first and second positions, wherein the second jaw has an elongated jaw body, one end of the jaw body being pivotally connected to the vernier via the pivot pin, a part of an end face of the end of the jaw body being a locating plane face, another part of the end face of the end of the jaw body being a rotary arched face in adjacency to the locating plane face, the pivot pin pivotally connected between the jaw body and the vernier being positioned at a curvature center of the rotary arched face.

2. The caliper as claimed in claim 1, wherein the first jaw has the form of an elongated bar, one end of the first jaw being connected to the scale ruler.

3. The caliper as claimed in claim 2, wherein the first measurement end protrudes from the other end of the first jaw and the second measurement end protrudes from the other end of the second jaw opposite to the first measurement end.

4. A caliper comprising: a main body having a scale ruler with a predetermined length, a vernier slidably disposed on the scale ruler and reciprocally displaceable along a length of the scale ruler and a restriction section for locking the vernier on the scale ruler without displacement, one side of the scale ruler being marked with a main scale along the length of the scale ruler, one side of the vernier being marked with a subsidiary scale; and a measurement section including a first jaw fixedly connected to one end of the scale ruler and a second jaw disposed on the vernier in alignment with and in parallel to the first jaw, a distance between the first jaw and the second jaw being variable with the displacement of the vernier along the scale ruler, a first measurement end protruding from one side of an end of the first jaw, which side is proximal to the second jaw, a second measurement end protruding from one side of an end of the second jaw, which side is proximal to the first jaw, said caliper being characterized in that the second jaw is pivotally connected to the vernier via a pivot pin and is swingable around the pivot pin between a first position and a second position to change an angle contained between the first and second jaws, the caliper further comprising a locating section disposed on the vernier, the locating section having a restriction body movable between a third position and a fourth position, when the restriction body is positioned in the third position, an abutment end of the restriction body being engaged with one side of the second jaw to restrict the second jaw to the first position, when the restriction body is positioned in the fourth position, the abutment end being disengaged from the second jaw, permitting the second jaw to freely swing between the first and second positions, wherein the restriction body is pivotally disposed on the vernier via the pivot pin and is rotatable around the pivot pin between the third position and the fourth position.

5. The caliper as claimed in claim 4, wherein the locating section further includes an elastic member sandwiched between the restriction body and the vernier for providing an elastic force to keep the restriction body in the third position.

6. The caliper as claimed in claim 5, wherein the elastic member is a spring.

7. A caliper comprising: a main body having a scale ruler with a predetermined length, a vernier slidably disposed on the scale ruler and reciprocally displaceable along a length of the scale ruler and a restriction section for locking the vernier on the scale ruler without displacement, one side of the scale ruler being marked with a main scale along the length of the scale ruler, one side of the vernier being marked with a subsidiary scale; and a measurement section including a first jaw fixedly connected to one end of the scale ruler and a second jaw disposed on the vernier in alignment with and in parallel to the first jaw, a distance between the first jaw and the second jaw being variable with the displacement of the vernier along the scale ruler, a first measurement end protruding from one side of an end of the first jaw, which side is proximal to the second jaw, a second measurement end protruding from one side of an end of the second jaw, which side is proximal to the first jaw, said caliper being characterized in that the second jaw is pivotally connected to the vernier via a pivot pin and is swingable around the pivot pin between a first position and a second position to change an angle contained between the first and second jaws, the caliper further comprising a locating section disposed on the vernier, the locating section having a restriction body movable between a third position and a fourth position, when the restriction body is positioned in the third position, an abutment end of the restriction body being engaged with one side of the second jaw to restrict the second jaw to the first position, when the restriction body is positioned in the fourth position, the abutment end being disengaged from the second jaw, permitting the second jaw to freely swing between the first and second positions, wherein the locating section further includes an engagement notch formed on one side of the second jaw, whereby when the restriction body is positioned in the third position, the abutment end of the restriction body is engaged in the engagement notch.

8. The caliper as claimed in claim 4, wherein the locating section further includes an engagement notch formed on one side of the second jaw, whereby when the restriction body is positioned in the third position, the abutment end of the restriction body is engaged in the engagement notch.

* * * * *